United States Patent [19]

Litterer et al.

[11] Patent Number: 4,740,955
[45] Date of Patent: Apr. 26, 1988

[54] COMMUNICATIONS SYSTEM HAVING VOICE AND DIGITAL DATA CAPABILITY AND EMPLOYING A PLURALITY OF VOICE AND DATA BUSES IN MAIN SERVICE UNIT AND SERIAL PACKETIZED TRANSMISSION TO AND FROM TELEPHONES

[75] Inventors: Joseph W. Litterer, Fairfield; John E. Anderson, Milford; Gary Mason, Middletown, all of Conn.; Minoru Shigematsu, Kawasaki, Japan; Fumikazu Hamatani, Milford, Conn.

[73] Assignees: TIE/Communications, Inc., Shelton, Conn.; Nitsuko Ltd., Kawasaki, Japan

[21] Appl. No.: 924,677

[22] Filed: Oct. 29, 1986

[51] Int. Cl.⁴ .............................................. H04Q 11/04
[52] U.S. Cl. ....................................... 370/67; 370/85
[58] Field of Search ................... 370/110.1, 85, 95, 60, 370/94, 66, 67

[56] References Cited

U.S. PATENT DOCUMENTS 4,535,448  8/1985  Baxter et al. ........................ 370/85
4,581,733  4/1986  Sarson et al. ........................ 370/85
4,611,321  9/1986  Gabrielli et al. ..................... 370/67

Primary Examiner—Douglas W. Olms
Assistant Examiner—Wellington Chin
Attorney, Agent, or Firm—Kenyon & Kenyon

[57] ABSTRACT

A communications system having a common equipment unit and a plurality of telephone station sets coupled to the common equipment unit comprises a common equipment unit having at least one trunk interface for coupling at least one central office telephone line to the common equipment unit and an analog to digital converter for converting analog signals on the telephone line into digital form, and at least one station interface coupling the common equipment unit to at least one of the station sets by a single wire pair. A plurality of buses couple the trunk interface and the station interface together, the plurality of buses comprising at least one digital voice bus for carrying digitized voice signals, a digital data bus for carrying digital data signals originating from a digital data device and a control data bus for carrying digital data comprising control information for controlling functions in the station sets for routing the data on the digital voice bus and the digital data bus between at least one of the station sets and the telephone line.

19 Claims, 8 Drawing Sheets

STATION INTERFACE CARD (IN CEU)

INTERFACE 1-8 OF STATION INTERFACE CARD (IN CEU)

"SUPERFRAME"

TELEPHONE SET INTERFACE (IN TELEPHONE)

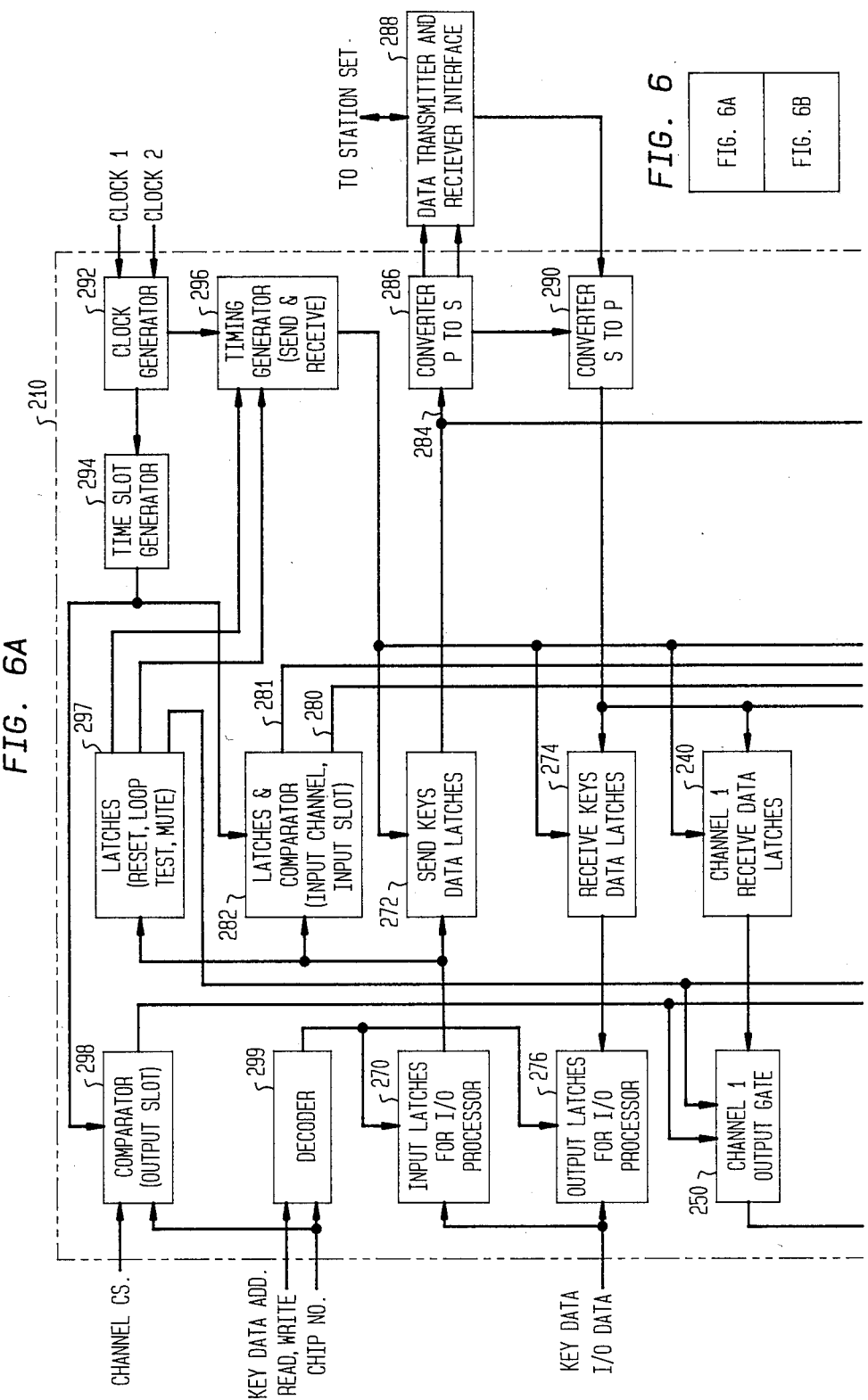

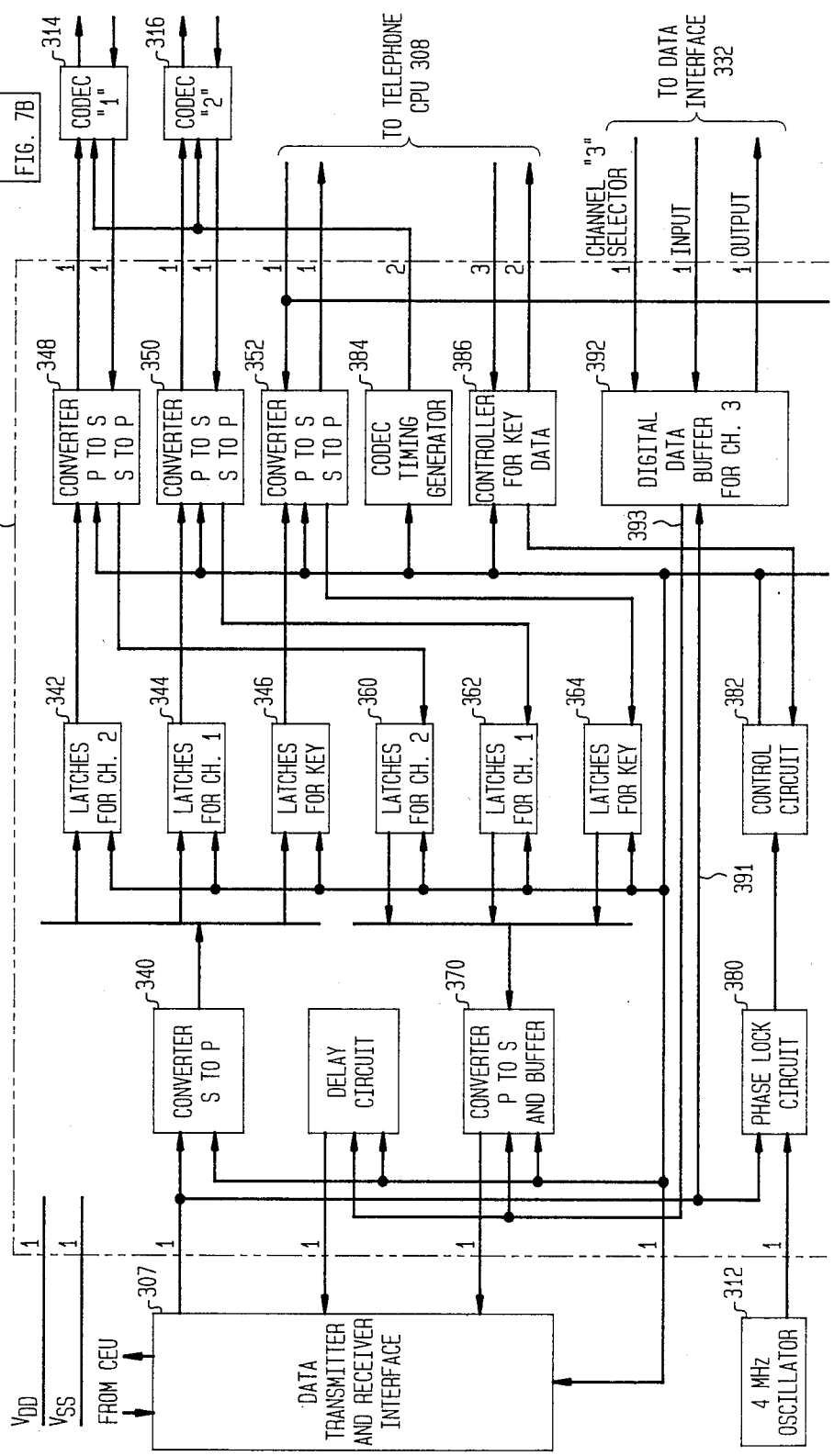

COMMUNICATIONS SYSTEM HAVING VOICE AND DIGITAL DATA CAPABILITY AND EMPLOYING A PLURALITY OF VOICE AND DATA BUSES IN MAIN SERVICE UNIT AND SERIAL PACKETIZED TRANSMISSION TO AND FROM TELEPHONES

BACKGROUND OF THE INVENTION (1) Field of the Invention

The present invention relates to communications systems, and in particular to a digital telephone communications system having the capability of exchanging both digitized voice and digital data signals. The invention further relates to Integrated Services Digital Networks (ISDNs). In particular, the invention relates to a telephone communications system having a common equipment unit employing a plurality of voice and data buses allowing both voice and digital data transfer and employing a serial digital packetized transmission protocol to and from telephones connected to the common equipment unit.

A need exists in the area of telephone equipment for a system which allows both voice and data signals to be exchanged. For example, it would be advantageous if, in a telephone system, a data terminal or computer could be connected to the telephone system so that digital data signals could be exchanged over the telephone system along with voice signals without interfering with voice communications. For example, a telephone system which also functions as a digital data network within the area in which the telephone system is located would be particularly useful for the transmission of digital data between digital data devices such as computers, printers and terminals. An important requirement of systems of this type is that the transmission of digital data signals does not interfere with the transmission of voice signals and vice versa, and that the transmission of digital delay signals does not reduce the capacity for voice switching.

(2) Description of the Prior Art

Applicants are aware of the following U.S. patents which relate to various features of telephone systems:

| | | | |
|---|---|---|---|
| 4,390,982 | 4,092,501 | 4,280,217 | 4,390,986 |
| 4,160,131 | 3,715,505 | 3,924,077 | 4,288,870 |
| 4,412,102 | 4,476,559 | 4,456,989 | 4,408,323 |
| 4,389,544 | 4,432,089 | 4,394,757 | 4,381,427 |
| 4,338,495 | 4,511,767 | 4,171,467 | 4,061,887 |
| 4,314,109 | Re. 29,884 | 4,339,633 | |
| 4,234,765 | 4,027,110 | 3,334,181 | |
| 4,112,261 | 4,313,036 | 4,309,765 | |

U.S. Pat. No. 4,390,982 discloses a digital private branch exchange system which uses a single processor to control the system. As shown in FIG. 2 of this patent, a group bus is employed which comprises two PCM buses. Each bus has provision for 32 channels. Of the available channels, a number are allocated to supervisory tones and common service features. Others are allocated both for conference purposes or for normal calls and still other channels are usable only for normal calls. All stations, trunks and options have access to both buses. As shown in FIG. 4 of this patent, a plurality of the channels on the first bus are available for use in handling calls while the remaining channels are allocated to specific call processing tones, such as dial tone, receiver off hook, etc. Each channel has eight time slots for an 8 bit word in that channel. On the second PCM bus, the channels are allocatable to conferencing with four three-party conferences and one four-party conference possible. The receive data for a conference uses the first three channels while the transmitter data uses the final three channels of the six channels required for a three-party conference. See the lower portion of FIG. 4 of this patent. The final eight time channels of the second bus are usable for four-party conferencing, four channels for receiving data and four channels for transmitting data. Although the '982 patent discloses the use of more than one bus for handling PCM voice data, it does not provide a system wherein a separate bus is provided for handling computer digital data, nor a system wherein the PCM voice data bus can also be used for handling computer data.

U.S. Pat. No. 4,381,427 descrribes a subscriber loop system for voice and data. In association with a time division multiplex (TDM) telephone system, the subscriber loop system provides voice and data communication with a remote telephone station set and an associated data port. The subscriber loop system includes a voice path and a data path coupling the telephones into the telephone system. The TDM telephone system comprises a plurality of separate buses, one of the buses being a TDM signal path into the system and the other bus being a TDM signal path out of the system.

U.S. Pat. No. 4,339,633 for a modular telecommunications system describes a system in which all systems control data is transmitted on one multiple conductor bus used to provide control data transfer. All speech and voice frequency data is transmitted on a second multiple conductor bus between modules of the system. This is shown in FIG. 5 of the '633 patent.

U.S. Pat. No. 4,112,261 for a key telephone system and method, shows a key telephone system having a key service unit comprising a talk pair bus and a control bus. Voice information is carried on the talk pair bus and control information is carried on the separate control bus.

U.S. Pat. Nos. 4,394,757 and 4,389,544 disclose digital telephone systems which utilize a frame format including a "superframe" formed of a plurality of data frames, each preferably comprising three 8-bit data words. The first data word of the frame includes a synchronization code and a signaling code, and the second and third data words include PCM speech samples or other digital data. According to this patent, the use of a multiword frame format permits the telephone apparatus to support two different telecommunications connections simultaneously. For example, as indicated in column 6 of the patent at lines 29 to 38, one connection may be made with another telephone subscriber for a voice communication while another connection is made with a data system for the transmission of digital data. Alternatively, the telephone apparatus may support a first subscriber to subscriber connection for normal voice communication plus a second subscriber to subscriber connection in a call-back function. The frame format is shown in FIGS. 2 and 3 of the '757 patent. As shown, the data is transmitted in serial form. According to the '757 patent, the telephone apparatus simultaneously transmits and receives one frame of information every 125 microseconds, i.e., the standard PCM sampling rate for telephone systems. Each signal frame is divided into at least two equal 8 bit time slots, one time slot for synchronization and signalling information and at least one, but preferably two, time slots for separate independent channels carrying PCM voice data and/or digital data. If three time slots are used, the data rate is 192 kbps. As shown in FIG. 2 of the patent, signalling and control information in the first word of the 125 microsecond frame is transmitted with the PCM voice data and the remainder of the 125 microsecond frame. The system described in this patent illustrates the state of the art known prior to the system of the present invention, as control and/or signalling information is transmitted every 125 microseconds. In contrast, in the present invention, in order to save processing time, control information is exchanged every 625 microseconds, as will be described below in detail, and is packaged along with information on three voice and digital data buses.

FIG. 3 of the '757 patent shows how 32 of the frames shown in FIG. 2 are packaged in a superframe of 32 frames, having a total transmission time of 4 milliseconds. In the first frame, synchronizing information and the first bit of signalling information is transmitted. In the following 8 frames, 8 bits of signalling information are transmitted in the same bit position. In the remaining 23 frames, stop bits are transmitted in the same bit position. With this arrangement, the patent indicates, one signalling byte is transmitted to and from the microcomputer every 4 milliseconds. During the time that the tenth through 32nd frames are transmitted and received, the microcomputer has time to control other functions of the telephone apparatus. Accordingly, this patent relates to the packaging of PCM voice data or digital data with synchronizing and signalling information, such that the microcomputer is freed up for other activities due to the transmission format. This patent indicates that the frame format facilitates the transmission of two or more independent and simultaneous voice and/or data channels within one PCM frame without any buffering. According to the patent, this format makes possible the provision of additional features, such as additional connections to peripheral units.

U.S. Pat. No. 4,280,217 discloses a time division switching system control arrangement. As shown in FIG. 6 of the '217 patent, the sampled analog signals from the telephones are converted to 8-bit PCM representations. The 8-bit PCM representations are used as parts of the data word transmitted to a time slot interchange unit 11. Each data word is 16 bits in length and comprises an 8-bit PCM data portion, a 7-bit signalling portion and a parity bit. The signalling portion is used to convey signalling information about the channel circuit or the subscriber set to which it is connected. The data words are transmitted from a channel circuit to a multiplex/demultiplex circuit which is connected to transmit and receive time multiplexed digital information to and from the time slot interchange unit. The multiplex/demultiplex circuit transmits digital information to the time slot interchange unit on a time multiplex line in 125 microsecond frames, each comprising 64 channels of 16 bits each. The multiplex/demultiplex circuit transmits digital information to the time slot interchange unit on a time multiplex line in 125 microsecond frames, each comprising 64 channels of 16 bits each. The multiplex/demultiplex circuit receives digital information from the time slot interchange unit via another time multiplex line in a format substantially identical to the format on the first time multiplex line. See col. 6, line 47 to col. 17, line 11 of the '217 patent.

U.S. Pat. No. 3,924,077 discloses a pulse code modulation time division multiplex telephone system which allows a plurality of subscriber sets to be connected at various points along a single wire pair. Each telephone contains circuitry for sending and receiving pulse coded speech samples at the proper instant within the time multiplex frame. As shown in FIG. 5 of this patent, sixteen 96 bit frames constitute a multiframe and each frame has a 125 microsecond duration. Each telephone on a line is permanently assigned a unique address corresponding to one of the 16 frames. Thus, each telephone has its own frame number within the multiframe during which it can connect itself in an available time slot.

U.S. Pat. No. 4,476,559 discloses a transmission system comprising apparatus for the transmission of voice signals, data signals or a combination of both voice and data signals in a multiplex system of 8-bit time slots over a single bidirectional digital channel. In a combined mode, the encoded voice signals are assigned to 4-bit positions of the 8-bit time slot and the data signals are assigned to the remaining 4 bits. Up to 2-bit positions normally used for data may be used for signature bits, thereby identifying whether the multiplex stream comprises voice signals only, data signals only or a combination of both voice and data signals.

U.S. Pat. No. 4,432,089 describes a digital loop transceiver for interfacing a digital private automatic branch exchange (PABX) to a digital subscriber set via a subscriber line. As shown in FIG. 6 of this patent, a frame of data transmitted to and from the telephone comprises an 8-bit digital data word for the first channel, an 8-bit digital data word for the second channel and the signalling bits of the first and second channel. As shown in FIG. 6 of this patent, the first channel may be digital data and the second channel may comprise voice information.

The above patents show various telephone systems, some of which allow the transmission of voice data and digital data. None of these systems, however, provide a relatively inexpensive system for the transmission of both digitized voice signals and computer digital data as contemplated by the present invention.

SUMMARY OF THE INVENTION

It is an object of the present invention to provide a telephone system which functions both as an in-house telephone system and a digital data network for digital data devices.

It is furthermore an object of the present invention to provide a telephone system wherein voice resources generally are not used to switch digital data, thus eliminating problems of interference or contention for system resources between the two services.

It is still another object of the present invention to provide a telephone system employing a plurality of voice paths and digital data paths.

It is yet another object of the present invention to provide an integrated services digital network (ISDN).

It is yet still another object of the present invention to provide a telephone system having a common equipment unit and a plurality of telephone station sets coupled thereto, with transmission of signals between the common equipment unit and the telephone station sets taking place via a packetized serial transmission protocol, preferably with one pair of wires.

It is yet another object of the present invention to provide a telephone system which utilizes a serial digital data transfer between the common equipment unit and each of the station sets.

It is yet still another object of the present invention to provide a telephone system which significantly reduces the speed of the processing equipment necessary in each of the telephone station sets, thereby significantly reducing the complexity and cost of the telephone station sets.

These and other objects of the present invention are achieved by a communications system having a common equipment unit and a plurality of telephone station sets coupled to the common equipment unit comprising at least one trunk interface means for coupling at least one central office telephone line to the common equipment unit and including means for converting analog signals on the telephone line into digital form and digital signals in the common equipment unit into analog form, at least one station interface means coupling the common equipment unit to at least one of the station sets, a plurality of bus means coupling the trunk interface means and the station interface means, the plurality of bus means comprising at least one digital voice bus means for carrying digitized voice signals, digital data bus means for carrying digital data signals originating from a digital data device and control data bus means for carrying digital data comprising control information for controlling functions in said station sets and for routing the data on the voice bus means and the digital data bus means among the station sets and the telephone line, and control means comprising computer means coupled to the plurality of bus means for generating at least some of the control information, the station interface means comprising means for converting the digitized voice signals, the digital data signals and the control information into serial form for transmission to a selected one of the station sets, and means for converting digitized voice signals, digital data signals and control information originating at the station set into parallel form for coupling to respective ones of the plurality of bus means.

The objects of the present invention are also achieved by a method for transmitting voice signals and digital data between a common equipment unit and a station set of a communications system having a plurality of telephone station sets comprising the steps of converting voice signals received on a telephone line coupled to the common equipment unit into digital form and supplying the digitized voice signals onto a digital voice bus, providing digital data signals from a digital data device onto a separate digital data bus, providing control information for operation of the station sets and for routing the voice signals and the digital data signals to a selected one of the station sets onto a separate control data bus, assembling the digitized voice signals, digital data signals and control information into a serial digital data format comprising successive packets of at least one byte of the data associated with the respective buses, transmitting the serial digital data format signal to the station set, receiving the serial digital data format signal at the station set and disassembling the signal into individual bytes of the digitized voice signals, digital data signals and control information.

In the preferred embodiment, the telephone station sets are each coupled to the common equipment unit by a single wire pair and communication is by a serial format digital data signal.

In a preferred embodiment of the invention, the common equipment unit comprises at least two digital voice buses. One of the digital voice buses has the capability of also handling digital data for a digital data device in addition to digitized voice signals. The provision of two simultaneous voice buses allows, for example, a user of a telephone station set to communicate with another extension or an outside line while at the same time receiving an intercom call from another extension.

The use of a separate digital data bus prevents interference between the digitized voice signals on the digital voice bus and the digital data on the digital data bus. Additionally, voice resources are not being used to switch digital data, thereby preventing high traffic on the digital data bus from impacting on voice transmission.

The system described, because of its capability of handling digital data and voice signals, can be used simultaneously as a PBX or key telephone system and as a digital local area network, i.e., an ISDN. At the same time, the system described herein provides these features relatively inexpensively. Thus, the system of the present invention provides significant advantages over other telephone and communications systems capable of handling both voice signals and digital data.

Other objects, advantages and features of the present invention will be apparent from the detailed description which follows.

BRIEF DESCRIPTION OF THE DRAWINGS

The invention will be explained in greater detail in the following detailed description with reference to the drawings in which:

FIGS. 6, 6A and 6B is a detailed block diagram of a part of the station interface card shown in FIG. 2; and FIGS. 7A and 7B is a detailed block diagram of a part of the station set interface shown in FIG. 5.

DETAILED DESCRIPTION

Figure 1:
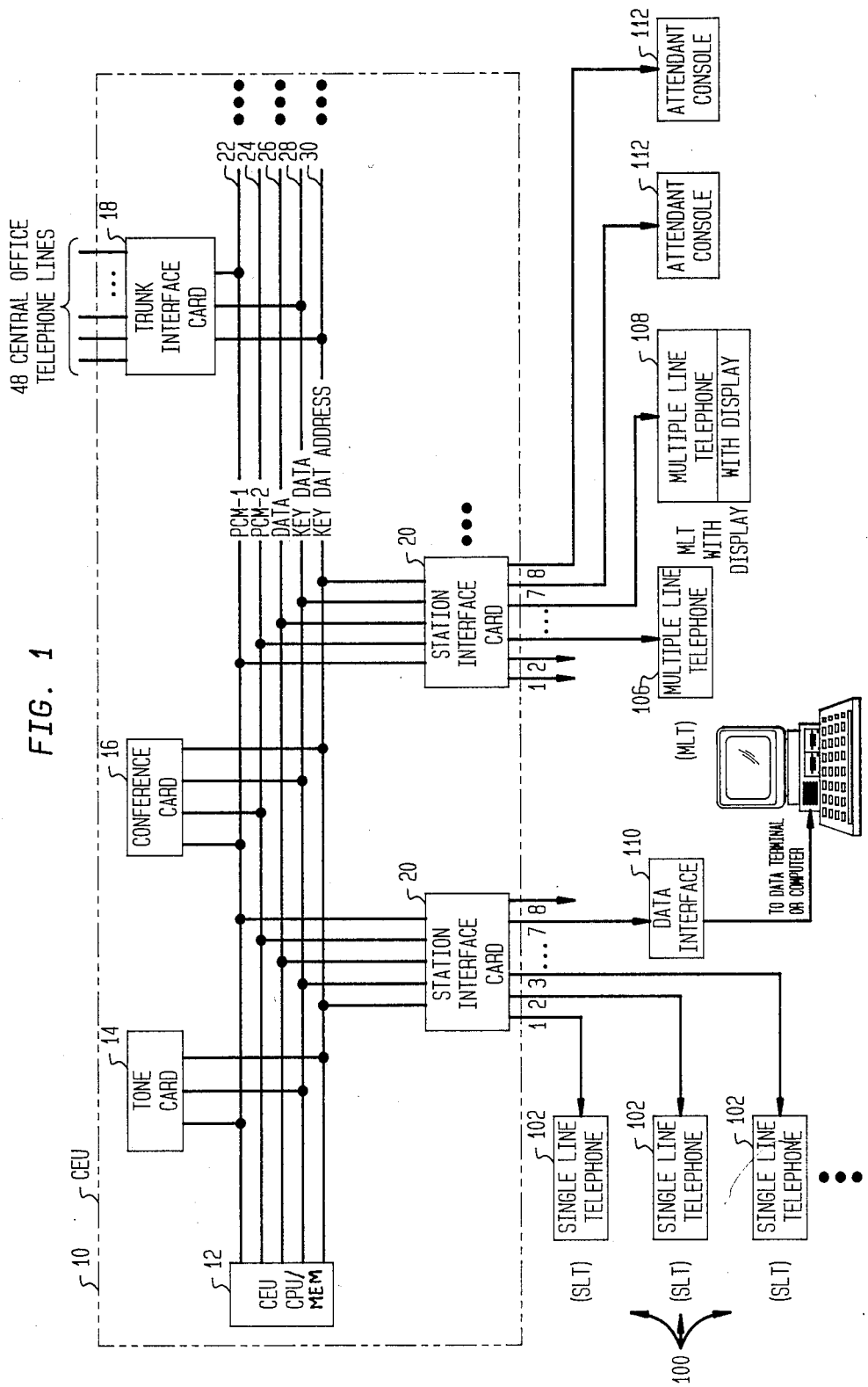
FIG. 1 is a block diagram of the overall system according to the invention.

With reference now to the drawings, FIG. 1 is a block diagram of the overall system according to the invention. The telephone system comprises a common equipment unit (CEU) 10, and a plurality of station units 100, which may comprise a number of single line telephones 102, multiple line telephones 106, multiple line telephones 108 with displays, digital data interface 110 and attendant consoles 112. The common equipment unit 10 comprises a CPU 12, a tone source card 14 which comprises means for performing auxiliary functions such as system tone generation, and music on hold, a conferencing card 16 which includes circuitry for performing conferencing functions, a trunk interface card 18 which couples the CEU to the central office telephone lines and converts analog signals on the telephone lines into a digital format, preferably PCM, and PCM signals in the CEU into analog form for transmission on the telephone lines, and a group of station interface cards 20. Each station interface card preferably has provision for coupling up to 8 station units, whether single line telephones, multiple line telephones, attendant consoles or digital data interfaces. The components of the CEU are interconnected by a plurality of buses including voice buses, PCM-1 and PCM-2, designated respectively with 22 and 24, a DATA bus 26, a key data bus 28 and a key data address bus 30. The purpose of these buses will be explained in greater detail below.

Figure 2:
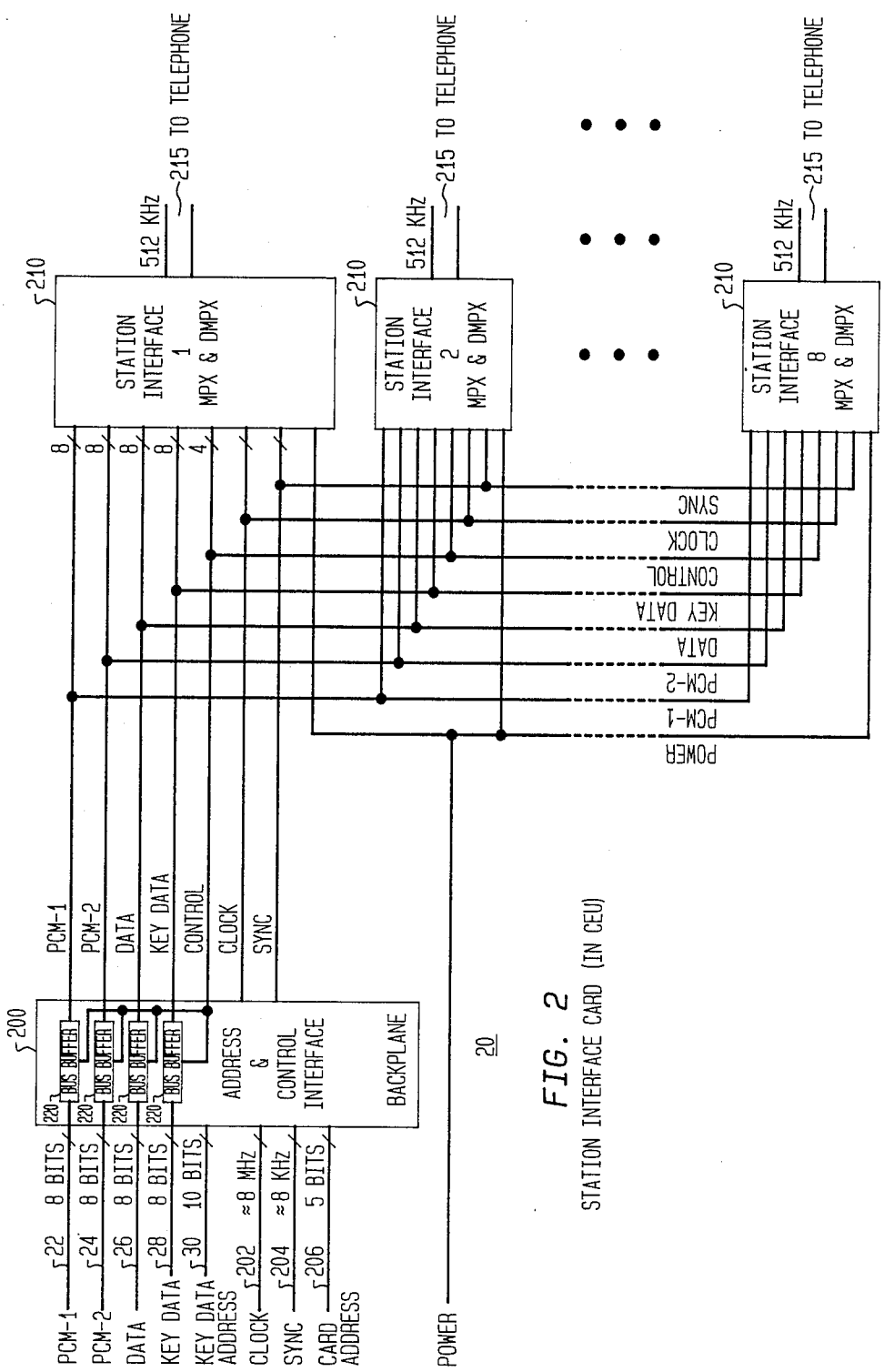
FIG. 2 is a block diagram of the station interface card of the system shown in FIG. 1.

FIG. 2 shows details of the station interface card 20 of the CEU 10. The station interface card 20 comprises an address and control interface 200 coupled to the PCM-1, PCM-2, DATA, key data and key data address buses. In the preferred embodiment, each of these buses comprises an 8 bit bus. Additionally, a clock signal 202 is provided to the address and control interface 200. The clock signal frequency is preferably approximately 8 MHz. Additionally, a synchronizing signal 204 is provided to the address and controller interface 200 having a frequency of approximately 8 KHz. Furthermore, a card address signal 206 is also provided to the address and control interface 200. The interface 200 includes a plurality of buffers 220, one for each of the buses. The card address bus 206 preferably comprises 5 bits wired separately for each card location. The purpose of address and control interface 200 is to generate a control signal (CONTROL) which is supplied to the plurality of station interfaces 210 in order to transmit data to and from the PCM-1, PCM-2, DATA and key data buses through the bus buffers 220. The control bus preferably is a 4 bit bus as shown. The station interfaces 210 and the address and control interface 200 both are part of the station interface card 20. The purpose of the station interfaces 210 is to convert the parallel data on the incoming PCM-1, PCM-2, DATA and key data buses, into a serial format for transmission on the single pan telephone lines 215 coupling the individual station sets to the CEU. Accordingly, the station interfaces 210 multiplex the data on the PCM-1, PCM-2, DATA and key data buses into a serial data format, to be described later. The frequency of the data bits on the lines 215 is approximately 512 KHz, in the preferred embodiment. Similarly, the station interfaces 210 also provide the reverse function of demultiplexing serial data coming from the station sets to the CEU. As shown in FIG. 2, the data on each of the PCM-1, PCM-2, DATA and key data buses is supplied to each of the station interfaces 210 through the bus buffers 220. The station interfaces are responsible for organizing the data on the various input buses into packets of data for that particular bus. As indicated above, the station interfaces also perform the function of inserting data for a particular station set with which it is associated into a serial data format. As indicated in FIG. 1, each station interface card 20 includes 8 station interfaces 210, and thus can accommodate up to 8 station sets. The station interface 210 selects the data on the various buses for insertion into a time slot based upon the data on the key data address bus 30.

Bus PCM-1 is provided for the transmission of digitized voice messages only, while bus PCM-2 is a dual purpose bus, which functions to transmit both digitized voice data and also digital data. The DATA bus 26 is provided only for the transmission of digital data information, such as digital data information from a computer terminal coupled to one of the station sets of the system. During high traffic periods, bus PCM-2 can accommodate some of the digital data information normally handled by the DATA bus. The key data bus is provided for the transmission of data responsible for operating the station sets, e.g., selection of station set functions and operation of displays, and for insuring that data from the various buses is inserted into the proper time slots. The key data address bus insures that the proper key data information is routed to the proper station set. The clock signal 202 is a system clock provided for system timing purposes and the sync signal 204 is a timing signal provided for system synchronization of the various circuit boards shown in FIG. 1.

Figure 3:
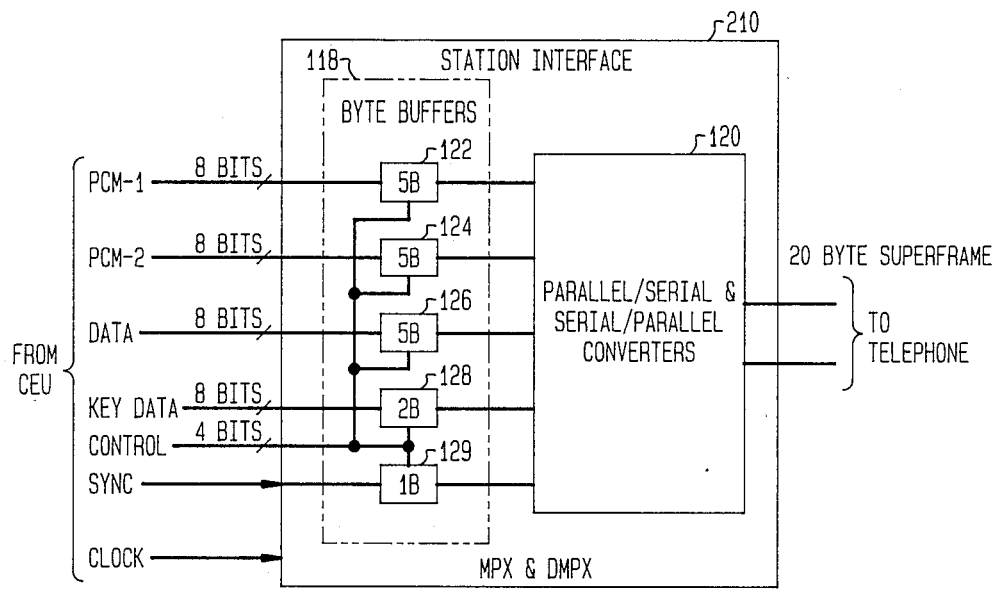
FIG. 3 is a block diagram of the station interface of the station interface card shown in FIG. 2.

FIG. 3 shows the basic block diagram of the station interfaces 210 in the station interface cards 20. As shown in FIG. 3, each station interface 210 comprises a group of buffers 118 for the temporary storage of information from the buses and a parallel to serial and serial to parallel converter 120. Buffers 118 comprise three buffers 122, 124 and 126 capable of handling 5 bytes of 8 bit information, one buffer 128 capable of handling 2 bytes of information and a buffer 129 for synchronizing signals. Buffer 122 is associated with the PCM-1 bus, buffer 124 is associated with the PCM-2 bus and buffer 126 is associated with the DATA bus. Buffer 128 is associated with the key data bus. Once the indicated number of bytes of information from the input buses has been assembled, the data is supplied in parallel form to the converter 120, which then arranges the data into blocks of serial data associated with each of the input buses.

Figure 4:
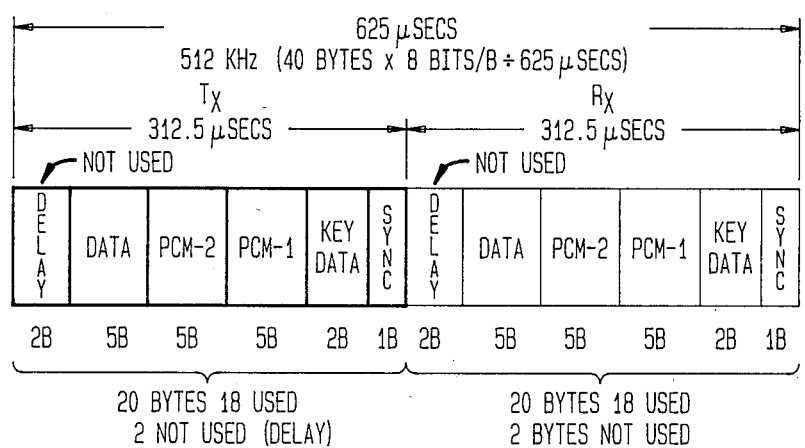
FIG. 4 illustrates the arrangement of data transmitted between the common equipment unit and each of the telephone station sets.

FIG. 4 shows the format of the serial data transmission between the station interfaces 210 and the station units 100. As shown in FIG. 4, the data transmission includes a transmit interval TX and a receive interval RX. The transmit and receive intervals together comprise a time period of 625 usecs consisting of 40 bytes of information, with each byte comprising 8 bits. This provides a data rate of 512 KHz. The transmit and receive intervals each therefore have a duration of 312.5 usecs. Each interval is arranged, according to the preferred embodiment, in blocks of a plurality of bytes. As shown, the signals on the DATA, PCM-2 and PCM-1 buses preferably are packaged in blocks of 5 bytes. The data on the key data bus is packaged in a block of two bytes and the sync signal comprises one byte. Two bytes are not used and are provided for implementing a delay time. The receive interval is grouped into blocks in the same manner as the transmit interval. Accordingly, in a 625 usec. interval, the first half of the time comprises the time period when data is transmitted from the CEU to a station set. In the second half of the interval, data is received from the station set by the CEU. The entire 625 usec. frame constitutes what is called herein a "superframe."

Figure 5:
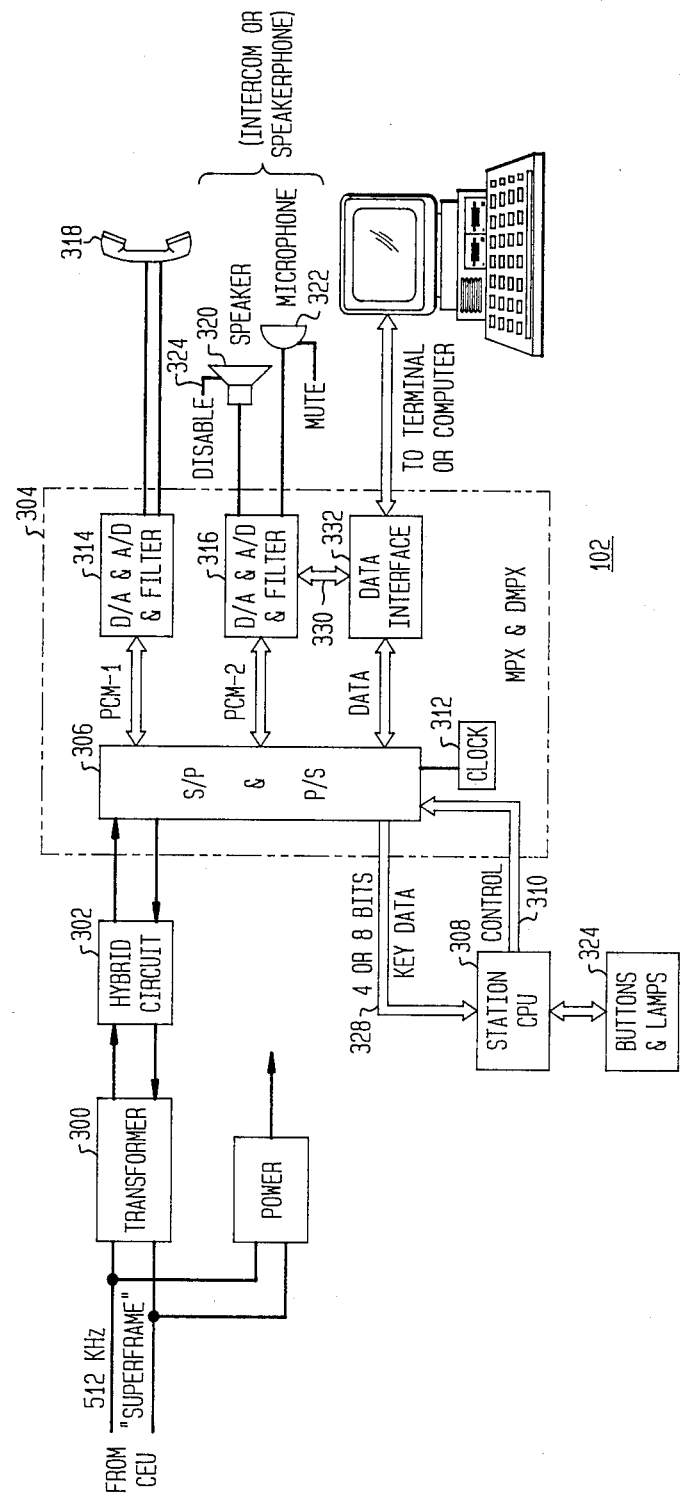
FIG. 5 is a block diagram of a telephone station set.

FIG. 5 shows the block diagram for a station set 100 comprising a single line telephone 102, although the same circuitry would also be provided in a multiple line telephone with provisions made for switching between incoming lines. The serial data from the KSU is provided to a matching and isolation transformer 300, as well known in the art. Power for the station set is supplied from the incoming lines from the CEU, and is typically phantomed over the incoming lines in a known fashion. The voice and data signals are coupled via the transformer 300 to a hybrid circuit 302, also well known to those skilled in the art. The output of the hybrid circuit 302 is supplied to a converter 304 which performs a serial to parallel conversion for incoming data from the hybrid circuit and a parallel to serial conversion for data being transmitted to the CEU. Converter 304 comprises serial to parallel and parallel to serial converter 306, which is controlled by a station CPU 308. The station CPU 308 controls converter 306 via a control bus 310. A clock 312 is provided to synchronize the operation of converter 306, and preferably has a frequency of 4 MHz. Converter 306 demultiplexes incoming serial data in the superframe and provides the data from the PCM-1, PCM-2, DATA and key data buses as shown in FIG. 5. The PCM-1 and PCM-2 data is provided to respective coder-decoders (CODECs) 314 and 316. CODECs 314 and 316 provide digital to analog and analog to digital conversion and a filtering function. Thus, PCM digitized audio data from the KSU is converted to an analog signal by the CODECs 314 and 316, suitably filtered by a low pass filter, and provided to the earpiece of handset 318 of the station set or loudspeaker 320 if the speaker-phone option is selected. If the speaker-phone option is not selected, loudspeaker 320 is disabled by a disable signal 324 and the microphone 322 is muted by a mute signal 326. These signals are supplied by the station CPU 308 in response to the information provided from the CEU in the key data. The key data information is supplied to the CPU from converter 306 over a bus 328. Digital data information from the DATA bus is supplied from converter 306 to a digital data interface 332, the output of which provides digital data signals compatible with a digital device such as a digital data terminal, printer or personal computer. As mentioned above, since the PCM-2 bus preferably provides the dual function of transmission of both audio signals and digital data signals if necessary, CODEC 316 also includes an output 330 to data interface 332.

CODECs 314 and 316 also provide the reverse function of converting analog signals from the handset mouthpiece or microphone of the station set into digital signals, for transmission to converter 306, which then performs a parallel to serial conversion so that voice signals and data from the station set can be transmitted back to the CEU.

Station CPU 308, in accordance with the key data information, also controls the scanning of push button switches of the station set and the operation of display lamps, as indicated at 324.

Figure 6B:
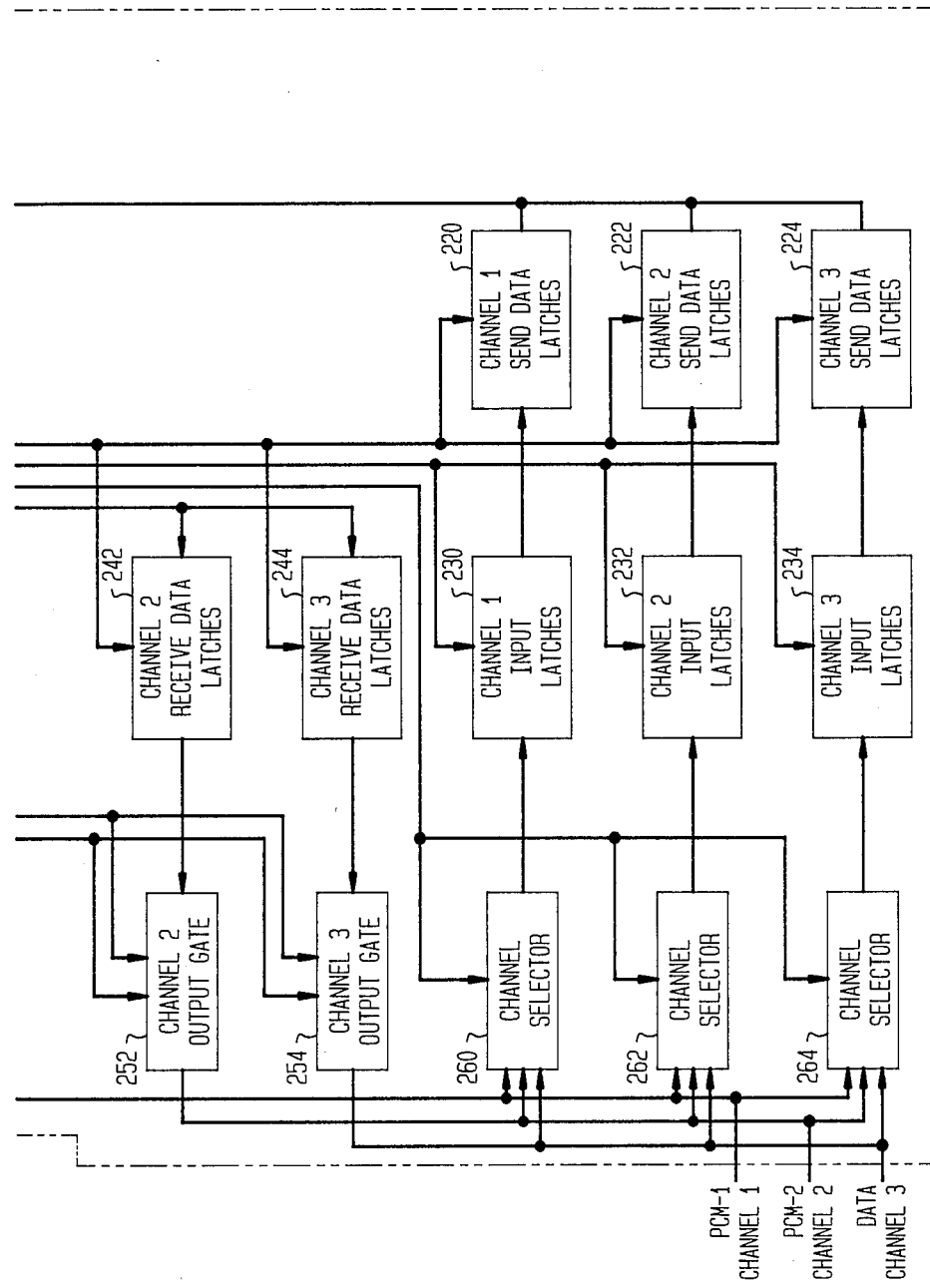

FIG. 6 is a detailed block diagram of station interfaces 210 shown in FIGS. 2 and 3. Station interface 210 comprises a plurality of channel send data latches 220, 222 and 224 and a plurality of channel receive data latches 240, 242 and 244. Each of the respective latches is associated with one of the buses PCM-1, PCM-2 and the DATA bus. Channel 1 is a bidirectional channel for PCM-1 data, channel 2 is a bidirectional channel for PCM-2 data and channel 3 is a bidirectional channel for digital data from the DATA bus. Associated with each of the send data latches are respective input latches 230, 232 and 234, and associated with each of the receive data latches are respective output gates 250, 252 and 254. Channel selectors 260, 262 and 264 are provided to select the appropriate channel at the proper time so that data on the PCM-1, PCM-2 and DATA buses can be multiplexed into the serial format indicated in the superframe of FIG. 4. Additionally, key data from the key data bus is fed to an input latch 270, the output of which is coupled to a send key data latch 272. Received key data from the station sets is stored in a receive key data latch 274, the output of which is coupled to an output latch 276 coupled to the key data bus.

Channel selectors 260, 262 and 264 are controlled by a control line 280 coupled to a latch and comparator circuit 282. The input of the latch and comparator circuit 282 is coupled to the output of key data input latch 270, and the key data from the key data bus determines which channel is selected at a certain time so that the data on the PCM-1, PCM-2 and data bus is placed into the proper time slot in the superframe. The outputs of the send data latches 220, 222, and 224 and the key data send latch 272 are coupled onto a bus 284 to parallel to serial converter 286. Converter 286 arranges the data from latches 272, 220, 222 and 224 into the superframe format shown in FIG. 4. The serial output of parallel to serial converter 286 is supplied to a data transmitter and receiver interface 288, and the serial data is transmitted to the station set associated with the station interface 210 during the TX interval. The serial data received from the station set during the RX interval is received by the data transmitter and receiver interface 288 and coupled to a serial to parallel converter 290. The parallel data is then forwarded to receive key data latch 274 and the channel receive data latches 240, 242 and 244. The outputs of the receive data latches are coupled respectively to output latch 276 (key data) and channel output gates 250, 252 and 254 (PCM audio data and digital data). The outputs of components 276, 250, 252 and 254 are then supplied to the respective buses, key data, PCM-1, PCM-2 and DATA.

Clock signals are coupled to a clock divider circuit 292, which provides timing signals for the send and receive data latches, and for a time slot generator 294 which generates the time slots into which data from the PCM-1, PCM-2, DATA and key data buses is entered when forming the superframe. The output of time slot generator 294 is coupled to latch and comparator circuit 282, the outputs 280 and 281 of which control, respectively, channel selectors 260, 262 and 264, and channel input latches 230, 232 and 234, thereby selecting particular ones of the channel buses at the appropriate times. The output of clock generator 292 is also provided to a timing generator 296 which generates the signals necessary for synchronizing the send and receive data latches. Latch and comparator circuit 282 is provided for setting up time slots for data from the CEU that is being converted into serial format in the superframe. Another comparator 298, also coupled to time slot generator 294, has an output which is coupled to the channel output gates 250, 252 and 254 thereby to write out the data stored in the channel receive data latches 240, 242 and 244 onto the PCM-1, PCM-2 and DATA buses. A decoder 299 having inputs comprising key data address information is provided for controlling the direction of key data information flow, i.e., whether the key data information is to be supplied via input latch 270 to a station set or the key data information is being supplied from a station set via output latch 276 to the CEU. A reset loop test mute latch 297 is also provided, having its input coupled to the output of the input key data latch 270. Outputs of latch 297 are provided to timing generator 296 and to output gates 250, 252 and 254. The purpose of latch 297 is to disconnect channel selectors 260, 262 and 264 from the PCM-1, PCM-2 and DATA buses during failure of a telephone set or I/O interface 288 and to make loopback routes for the PCM-1, PCM-2, DATA and key data buses.

Figure 7B:
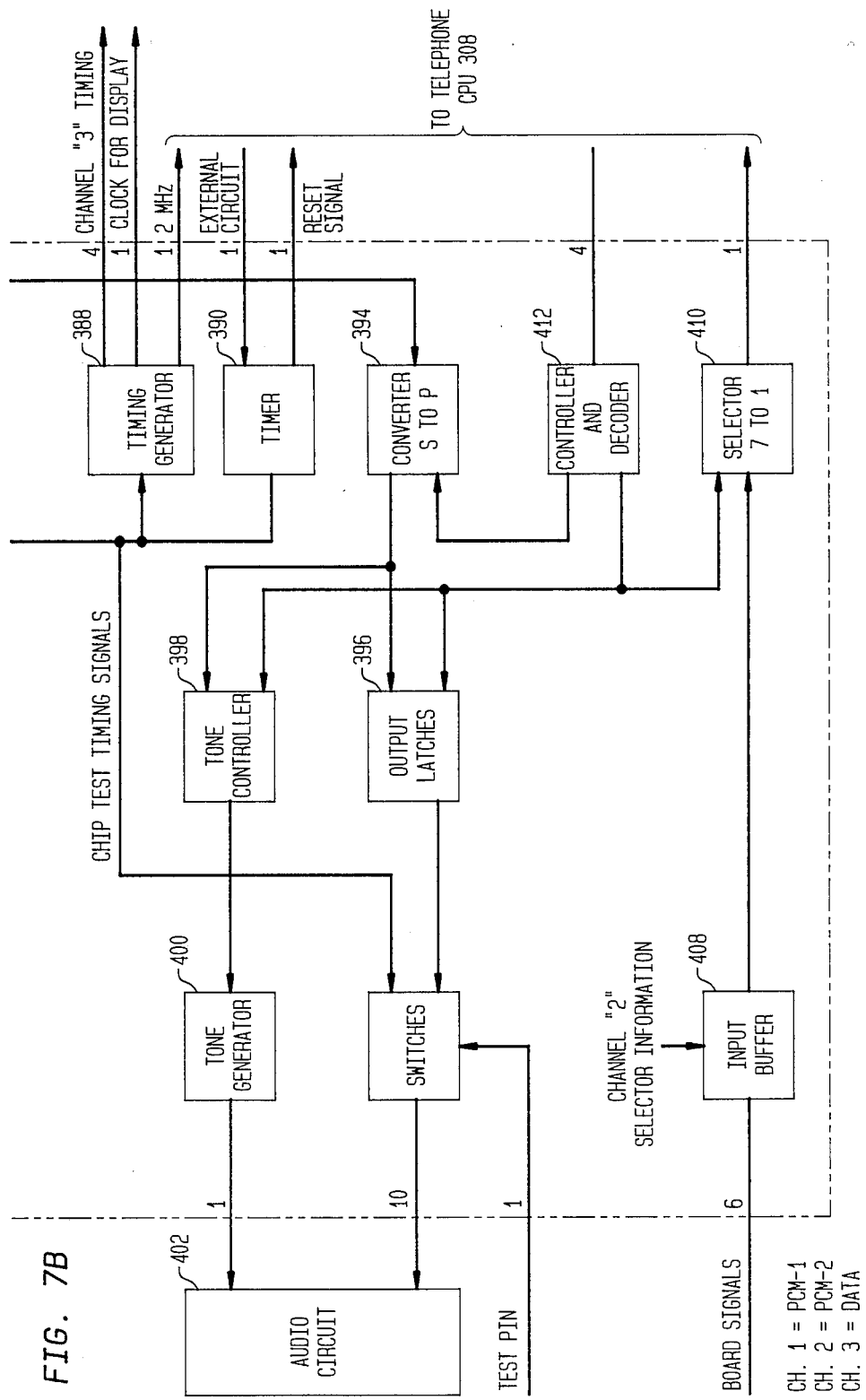

FIG. 7 shows the block diagram of serial to parallel and parallel to serial converter 306 of the station set interface, which is a part of the converter 304 shown in basic form in FIG. 5. Converter 306 receives signals via a data transmitter and receiver interface 307 from the connecting lines coupling the station set to the CEU. The output of interface 307 is provided to a serial to parallel converter 340 via line 338. Converter 340 converts data on line 338 from a serial to a parallel form. The output of converter 340 is coupled to a group of latches 342, 344 and 346. Latch 342 is provided for data originating on the PCM-2 bus, latch 344 is provided for data originating on the PCM-1 bus and latch 346 is provided for key data from the key data bus. The outputs of latches 342, 344 and 346 are coupled to respective further converters 348, 350 and 352. Converters 348, 350 and 352 perform a dual function of parallel to serial and serial to parallel data conversion. Parallel data from latches 342, 344 and 346 is converted to serial form for input to CODECs 314 and 316, which then convert the serial data into analog form for transmission to the output transducers, e.g. the telephone handset 318 earpiece or the loudspeaker of the speaker-phone. Analog information from the mouthpiece of the handset 318 or the microphone is coupled to CODECs 314 and 316 and converted into serial digital form. Converters 348 and 350 then convert the serial digital data to parallel form for transmission to respective latches 360, 362 and 364. Latches 360, 362 and 364 latch the parallel data from respective converters 340, 350 and 352, and transmit the latched data to a further converter 370, which functions as a parallel to serial converter. Converter 370 assembles the digital voice data key, data and digital data (from buffer 392) into the superframe format. Serial data from converter 370 is then transmitted to the interface 307 for transmission to the CEU.

As shown in FIG. 7, converter 352, which is provided for handling the key data information, is coupled to station set CPU 308. The key data information is used by the station set CPU for selecting functions and providing display indications.

Clock circuit 312 provides a clock signal to converter 306. The output of clock circuit 312 is coupled to a phase lock circuit 380, which locks the output of clock circuit 312 to a clock signal transmitted from the CEU. The locked clock signal is provided to a control circuit 382, the output of which is provided as a clock signal to converters 348, 350 and 352, a CODEC timing generator 384, a key data controller 386, a timing generator 388 provided for synchronizing data from the digital data bus, and a timer 390. Timer 390 is provided for resetting the telephone station CPU 308 when synchronization with the CEU is stopped. Digital data buffer 392 is provided for buffering digital data from the digital data bus and for forwarding digital data to and from digital data interface 332. Digital data from the DATA bus is supplied to buffer 392 via line 391 and supplied to converter 370 via line 393.

Key data information originating at the station set is also fed to a serial to parallel converter 394. Converter 394 converts the key data information into parallel form and couples the key data information to output latch 396 and tone controller 398. Thus, the depression of particular keys on the keyboard of the station set is interpreted by station CPU 308, and converted to key data information for transmission not only to the CEU via converter 352, but for local use in generating tone signals (for identifying system functions). The generation of the tone signals is performed by a tone generator 400, and an audio circuit 402 includes the necessary amplifier circuitry.

An input buffer 408 is provided for testing what hardware options are provided in the connected telephone station sets and the output of buffer 408 is coupled to a selector circuit 410. The output of selector circuit 410 is coupled to telephone CPU 308. Selector circuit 410 is provided for multiplexing data and hardware option information. A controller and decoder 412 has outputs coupled to selector circuit 410 and converter 394 and is provided for receiving serial data commands from telephone CPU 308.

Accordingly, a telephone communications system having the ability to transmit both voice information and digital data information has been disclosed. The telephone system described has the capability of operating both as a private branch exchange telephone system and as a local area network for digital data devices. This capability is provided by the use of a plurality of voice and data buses in the common equipment unit and the use of a serial packetized data transmission protocol between CEU and station sets, which allows efficient packaging of voice, digital data and control information. Furthermore, the use of the serial packetized data transmission protocol between CEU and station sets as described provides for efficient transmission of data between the CEU and station set and allows the use of a slower and therefore less expensive microprocessor in the station set, thus reducing overall system cost and complexity. In contrast with prior art digital telephone systems, the station set processor is only interrupted once every 625 usecs., to handle control (i.e., key data information), rather than once every 125 usecs., thus allowing the station set processor to operate at one fifth of the rate conventionally required. This allows a slower and less expensive processor to be used in the station set and frees up the processor for other functions.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification is, accordingly, to be regarded in an illustrative rather than in a restrictive sense.

What is claimed is:

1. A communications system having a common equipment unit and a plurality of telephone station sets coupled to the common equipment unit comprising:

at least one trunk interface means for coupling at least one central office telephone line to said common equipment unit and including means for converting analog signals on said telephone line into digital form and digital signals in said common equipment into analog form;

at least one station interface means coupling said common equipment unit to at least one of said station sets;

a plurality of bus means coupling said trunk interface means and said station interface means, said plurality of bus means comprising at least one digital voice bus means for carrying digitized voice signals, digital data bus means for carrying digital data signals originating from a digital data device and control data bus means for carrying digital data comprising control information for controlling functions in said station sets and for routing the data on said voice bus means and said digital data bus means among said station sets and said telephone line;

control means comprising computer means coupled to said plurality of bus means for generating at least some of said control information;

said station interface means comprising means for converting said digitized voice signals, said digital data signals and said control information into serial form for transmission to a selected one of said station sets, and means for converting digitized voice signals, digital data signals and control information originating at said station set into parallel form for coupling to respective ones of said plurality of bus means.

2. The telephone system recited in claim 1 wherein said station set is coupled to said station interface means by a single wire pair.

3. The communications system recited in claim 2 wherein said station interface means comprises:
buffer means coupled to respective ones of said plurality of bus means; and
converter means coupled to each of said buffer means for converting outputs of said buffer means into serial form and for assembling data from said buffer means into successive packets of serial data, each packet representing at least one byte of data on a respective one of said bus means, said converter means further converting serial data from said station set into parallel form and disassembling said serial data into individual bytes of data for coupling to respective ones of said bus means.

4. The communications system recited in claim 3 wherein said digital voice bus means comprises first and second digital voice bus means.

5. The communications system recited in claim 4 wherein said second digital voice bus means comprises means for transmitting digitized voice data and optionally digital data for a digital data device.

6. The communications system recited in claim 4 wherein said buffer means comprises a plurality of buffer means, one buffer means for each of said bus means.

7. The communications system recited in claim 6 wherein said buffer means for each of said digital voice bus means and digital data bus means comprises means for storing a first plurality of bytes of data from the associated bus means and said buffer means for said control information comprises means for storing a plurality of bytes of data from the associated bus means less than said first plurality.

8. The communications system recited in claim 7 wherein said serial data exchanged between said common equipment unit and said station set comprises a group of successive packets of bytes of data from respective ones of said bus means for transmission to said station set and a group of successive packets of bytes of data for transmission to respective ones of said bus means from said station set.

9. The communications system recited in claim 2 wherein said station set comprises:
first means for converting said serial data from said common equipment unit into parallel form;
first means for changing the digitized voice data of said serial data converted into parallel form into an analog signal for coupling to an output transducer;
second means for changing analog signals from an input transducer into digital form;
second means for converting said signals in digital form from said input transducer into serial digital signals for transmission to said common equipment unit; and
control means receiving said control information from said common equipment unit for controlling said means for converting and said means for changing.

10. The communications system recited in claim 9, further comprising digital data interface means coupled to said means for converting for receiving digital data from said digital data bus means of said common equipment unit and for receiving digital data from a digital data device and supplying said digital data to said second means for converting for transmission to said common equipment unit.

11. The communications system recited in claim 3 wherein said converter means coupled to each of said buffer means comprises means for assembling a plurality of bytes of said digitized voice signals and said digital data signals together with at least one byte of said control information.

12. A method for transmitting voice signals and digital data signals between a common equipment unit and a station set of a communications system having a plurality of telephone station sets comprising the steps of:
converting voice signals received on a telephone line coupled to the common equipment unit into digital form and supplying the digitized voice signals onto a digital voice bus;
providing digital data signals from a digital data device onto a digital data bus;
providing control information onto a control data bus for operation of the station sets and for routing said digitized voice signals and said digital data signals to a selected one of the station sets;
assembling said digitized voice signals, digital data signals and control information into a serial digital data format comprising successive packets of at least one byte of the data associated with the respective buses;
transmitting said serial digital data format signal to said station set; and
receiving said serial digital data format signal at said station set and disassembling said signal into individual bytes of said digitized voice signals, digital data signals and control information.

13. The method recited in claim 12 wherein said step of transmitting said serial digital data format signal to said station set comprises the step of transmitting said serial digital data format signal over a single wire pair.

14. The method recited in claim 13, further comprising the steps of converting said digitized voice signals at said station set into analog form and supplying said analog signals to an output transducer.

15. The method recited in claim 14, further comprising the step of supplying said digital data signals to a digital data device.

16. The method recited in claim 13, further comprising the step of utilizing said control information to control at least one of a plurality of functions of said station set.

17. The method recited in claim 14, further comprising the steps of receiving analog voice signals at said station set, converting said analog signals into a digitized voice signal, receiving digital data signals from a peripheral digital data device at said station set, generating control information at said station set, assembling said digitized voice signals, digital data signals and control information into serial form comprising successive packets of at least one byte of said data, and transmitting said data to said common equipment unit.

18. The method recited in claim 16 wherein each of said packets of data comprises a packet of a plurality of bytes of one of said digitized voice signals, digital data signals and control information.

19. The method recited in claim 13 wherein said step of supplying comprises supplying said digitized voice signals onto a plurality of digital voice buses.

* * * * *